Fig.1.

United States Patent Office 3,442,590
Patented May 6, 1969

3,442,590
DOPPLER VELOCITY MEASURING APPARATUS
David Anthony Neish and Stephen Charles Lauder Botcherby, London, England, assignors to Decca Limited, London, England, a British company
Filed Sept. 24, 1965, Ser. No. 489,830
Claims priority, application Great Britain, Sept. 28, 1964, 39,374/64
Int. Cl. G01p 3/36, 3/68
U.S. Cl. 356—28     3 Claims

ABSTRACT OF THE DISCLOSURE

A Doppler velocity measuring apparatus using a laser beam in which a rotating chopper disc is disposed in the path of the laser beam to a moving object. Light from the laser is mixed with light reflected from the object. The resultant is received by a frequency tracking loop which includes a phase detector operating at the frequency of the modulation provided by the disc. The phase detector controls a voltage controlled oscillator forming part of the loop.

---

This invention relates to Doppler velocity measuring apparatus using a coherent light beam from a laser. The light may be visible light but it is possible for a laser to generate frequencies outside the visible spectrum, for example of infra red frequency, and the term "light" will therefore be used in the following description to refer to radiation of any frequency which can be produced in a coherent beam by a laser.

One of the problems with measuring velocity using a Doppler technique with a laser beam is that frequencies may be generated in the laser which can beat together to give spurious signals which may be confused with the required Doppler beat frequency. This makes it difficult to follow variations in the Doppler beat frequency corresponding to speed variations using frequency tracking circuits since the tracker may lock on to one of these spurious frequencies.

According to the present invention, in Doppler velocity measuring apparatus comprising a laser producing a coherent light beam which is directed on to a moving object, a light sensitive device to receive light both reflected back from the moving object and directly from the laser and means responsive to the Doppler beat frequency in the output of said light sensitive device, means are provided for modulating the transmitted light beam after it has left the laser or the reflected light beam at a predetermined frequency and the aforesaid means responsive to Doppler beat frequency is arranged to be responsive to signals containing components of said predetermined frequency. The modulation frequency is made of a different order from the Doppler beat frequency and thus the Doppler beat frequency is modulated at said predetermined frequency and may be distinguished from signals coming directly from the laser which are normally much stronger and are not so modulated. Typically, the Doppler beat frequencies might be between a few kc./s. and perhaps 2 mc./s. and it is thus convenient to modulate the light beam at a frequency below the Doppler beat frequency, using, for example, a frequency of between 100 cycles and 1 kc./s.

The light beam may be modulated by chopping, for which a Kerr cell might be used. More conveniently however the chopping is effected using a rotating disc driven at an appropriate speed.

In one arrangement falling within the scope of this invention, the transmitted beam may be directed on to beam splitting means splitting the laser beam such that a first cell receiver, both transmitted and reflected light and a second cell receives the transmitted light only.

The first cell acts as a photomixer to produce an output which contains the Doppler frequency modulated at the predetermined frequency. The beam splitting means may comprise a first half silvered mirror arranged at 45° to the transmitted laser beam to direct reflected light onto a second half silvered mirror, at which reflected light is directed back through the first mirror to said first cell and transmitted light passes to said second cell. The laser beam transmitted through the first mirror without reflection strikes the moving object and returns to the reverse side of the first mirror, whereat a portion is directed to said first cell and the remainder passes back to the laser. Alternatively, the mirror system may be replaced by a polarization beam-splitter, in which the beam is split by 45° prisms whose hypotenuse sides are separated by a multilayer variable dielectric coating. With this arrangement the beam splitting may be achieved without considerable loss of power. With either of the two arrangements mentioned above, this second cell acts as a photomixer whose output will contain the Doppler beat frequency and the first cell will contain only the transmitted frequency and the spurious frequencies generated by the laser. The outputs of the two cells may be fed to a difference amplifier to remove or reduce the spurious frequencies generated by the laser.

In an alternative arrangement, the laser is of the kind having a mirror at each end with the light injected into the material between the mirrors (for example a ruby laser or a gas laser) and the apparatus is arranged so that the coherent light beam is directed from one end of the laser onto the moving object and the light sensitive device is provided at the other end of the laser to receive light from the laser including light reflected back from the moving object through the laser. With this arrangement, the laser will amplify the reflected light provided the frequency of the reflected light is within the frequency band of the laser. This arrangement is more suitable for use at low Doppler frequencies; it is readily possible in practice to ensure that the Doppler frequency shift is relatively small by directing the light beam on to the moving object at an angle to the direction of movement so that the velocity sensed is the actual velocity of the body multiplied by the cosine of the angle between the direction of movement and the direction of the light beam. This arrangement, which may of course also be used with the prior arrangements described, is often convenient because the apparatus would not have to be in the path of the moving object, which might typically be an extrusion coming from an extrusion press or a metal billet leaving a rolling mill; the laser and the associated equipment may be located at one side of the path of the moving body with the light beam directed in a direction which is typically very nearly normal to the direction of movement of the body.

A lens system may be provided between the laser and the moving body to collect light reflected from a small area of the body but which may be scattered over a large angle. To avoid broadening the frequency spectrum of the returned signals it may be further desirable in some cases to shape the light beam by masking off the lens to ensure that only light providing substantially the same Doppler shift is utilised.

A Doppler beat frequency may be extracted from the electrical output of the light sensitive device using a frequency tracker. Various forms of frequency tracker suitable for this purpose have been developed for microwave airborne Doppler navigation systems.

The output from the light sensitive device may be fed to a frequency tracker comprising a voltage controlled oscillator giving two outputs in phase quadrature which are separately mixed with the incoming signal. The outputs of these two mixers are passed through low pass filters, then through phase shifting circuits to give a relative phase shifter of 90° and then combined to give an output signal which will be zero if the voltage controlled oscillator has an output at the centre frequency of the spectrum of the incoming Doppler beat component. The output from this mixer is passed to a phase sensitive detector where it is detected at the light beam modulation frequency. If the beam is chopped using a mechanical chopper such as a rotating disc, the required control signal for the phase sensitive detector may be obtained from the chopping device, for example, by using a photo cell. One way of doing this would be to arrange a light source and the photo cell on opposite sides of the rotating disc and remote from the point at which the laser beam is passed through the disc. The phase sensitive detector will thus detect only those components which are modulated at the chopping frequency and may provide a direct voltage output which can be used to control the voltage controlled oscillator and to feed a recorder or indicator to record or indicate the velocity. Alternatively or additionally this direct voltage output may be used to operate a servo system controlling indirectly or directly the velocity of said moving object. One such system is described and claimed in our co-pending application No. 453,349, now Patent No. 3,344,632.

In the following description, reference will be made to the accompanying drawings in which:

FIGURE 1 is a diagram illustrating one embodiment of this invention; and

Figure 1:
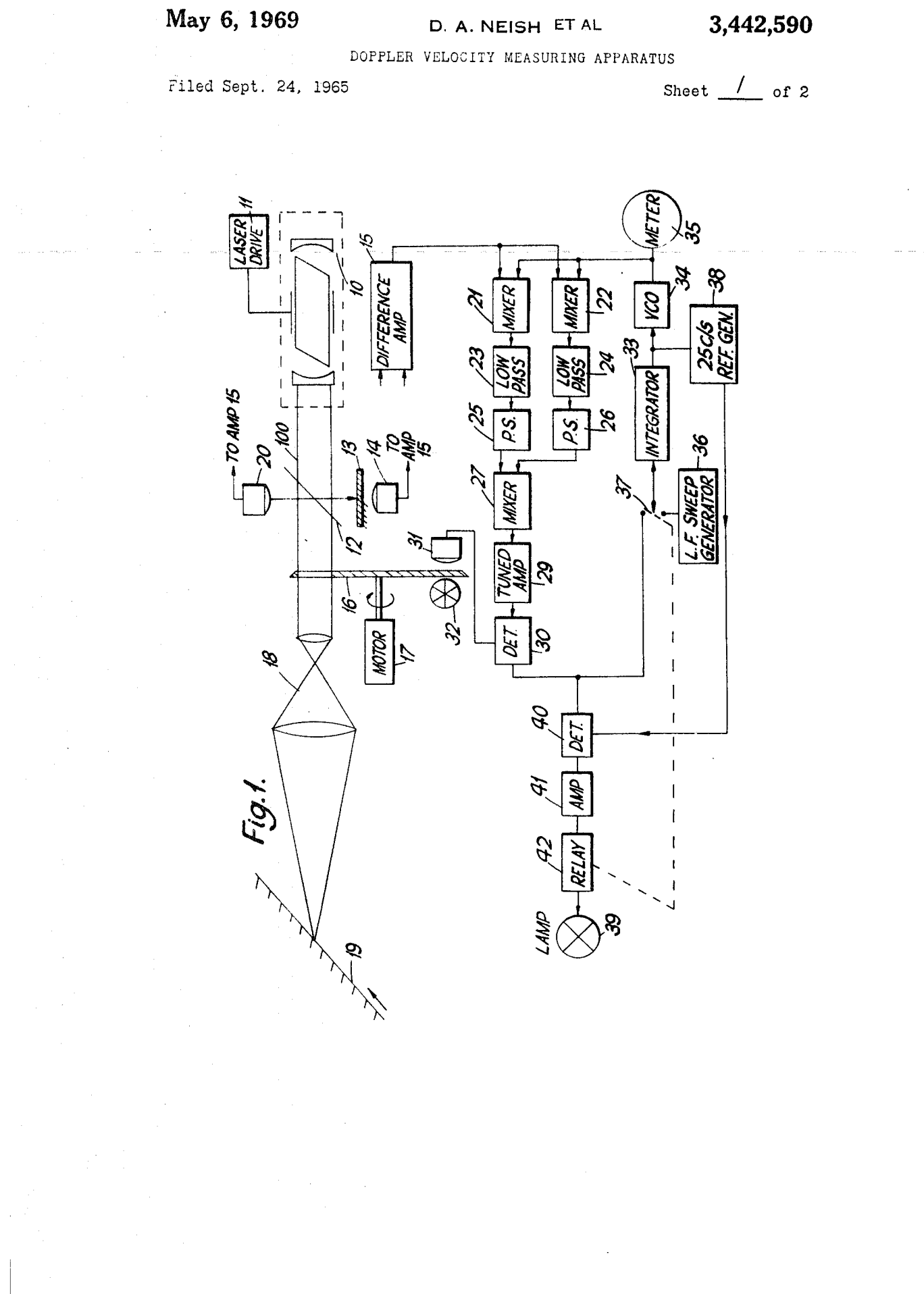
Figure 2:
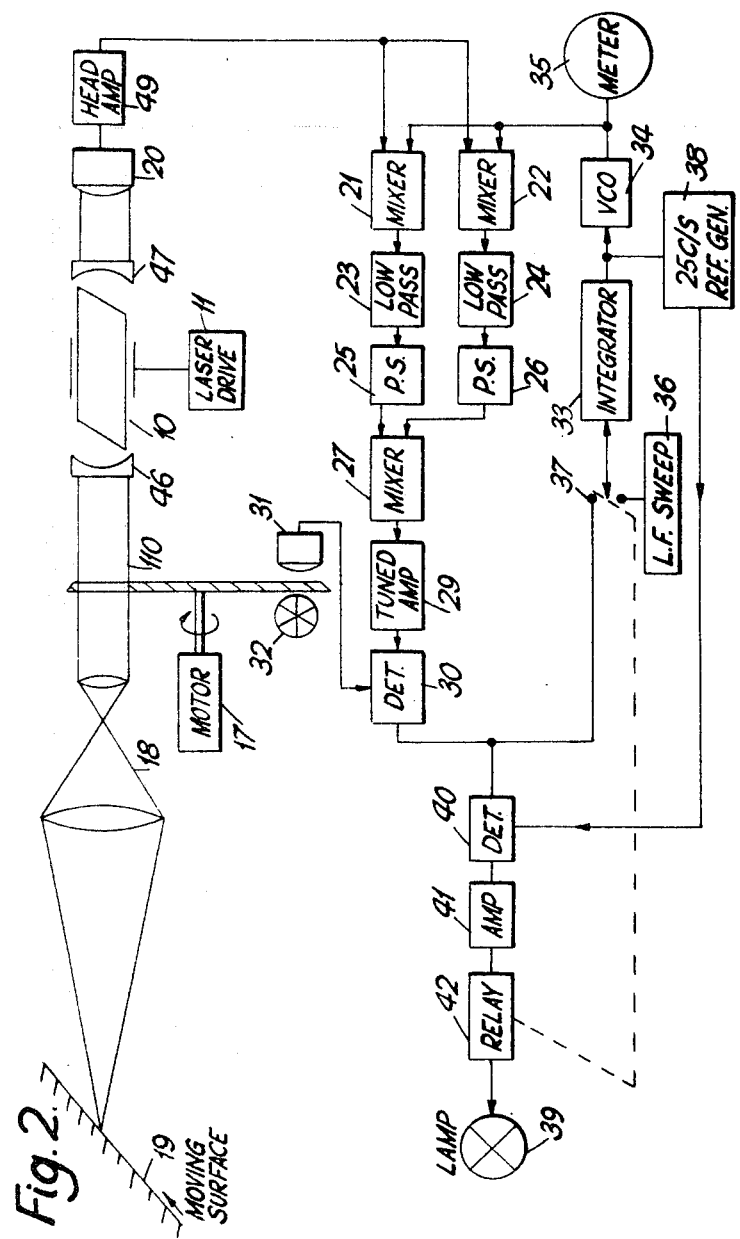
FIGURE 2 is a diagram illustrating a further embodiment of this invention.

In FIGURE 1, the laser 10 is a gas or ruby laser which is energised from the laser drive 11. The laser drive 11 may be a D.C. drive unit providing a suitable pump frequency for the laser but might also be an A.C. unit. The laser beam 100 is directed on to the half silvered mirror 12 disposed at 45° to the beam 100. Reflected light is reflected through the half silvered mirror 13 and to the cell 14 and also reflected from mirror 13 back through mirror 12 to the photomixer 20. It will be understood that mirrors 12 and 13 each have distributions silvering rather than continuous silvering over one portion of the mirror. The portion of the laser beam transmitted by mirror 12 passes to the lens system 18 directing the beam onto the moving surface 19. The transmitted beam, after it has left the mirror 12, is chopped by the perforated rotating disc 16 (having, for example sixteen circular perforations spaced around its periphery) driven at a suitable frequency to give typical modulation frequency of 133 c./s., by the motor 17. Light reflected back from the moving surface passes through the lens system 18 and rotating disc 16 to the reverse side of the half silvered mirror 12 to be partly directed on to photomixer 20 and partly back to the laser. The difference amplifier 15 is coupled to receive the outputs of cell 14 and photomixer 20 to give an output containing the Doppler frequency modulated by the chopper frequency, the spurious laser frequencies being removed or at least reduced.

The output from the difference amplifier 15 is fed to the mixers 21 and 22 where it is separately mixed with two outputs in phase quadrature from the voltage controlled oscillator 34. The outputs from the mixers 21 and 22 are fed through low pass filters 23 and 24 and phase shifters 25, 26 which give a relative phase shift of 90° and then combined in the mixer 27 which will give zero output when the oscillator frequency is equal to the incoming Doppler beat frequency. The output from mixer 27 is fed to the amplifier 29 tuned to the modulating frequency at which the light beam 100 is modulated by the rotating disc 16. The output from amplifier 29 is fed to the phase sensitive detector 30. This phase sensitive detector is controlled by the cell 31 which produces an output at the modulation frequency, being energised by the light source 32 through the disc 16. The phase sensitive detector 30 therefore operates at the light beam modulation frequency and gives a direct voltage output representative only of the Doppler beat frequency modulated at the chopper frequency. The direct voltage output is fed back through the integrator 33 to control the voltage controlled oscillator 34. The output of the voltage controlled oscillator, if the circuit is tracking correctly, corresponds to the Doppler beat frequency. One output of the voltage controlled oscillator 34 may be fed to the frequency speed meter 35 which thus indicates the speed of the moving surface. Alternatively, the output of oscillator 34 may be used in a servo system to control the velocity of the moving object.

The system as thus far described enables the Doppler frequency shift to be obtained using a laser directing light on to a moving object without the danger that the spurious frequencies generated by the laser will give rise to spurious Doppler frequencies resulting in an incorrect determination of velocity. The system shown in FIGURE 1 also includes, as is the practice with Doppler systems, means for ensuring that the frequency tracking unit properly locks on to the Doppler beat frequency. For this purpose, the low frequency sweep generator 36 may be connected to the input of the integrator 33 by switching the bipolar switch 37. The low frequency sweep will cause a slowly changing voltage to appear at the output of the integrator, which will cause the frequency of the controlled oscillator to vary slowly throughout the range in which the Doppler frequency is expected to be. To the input of the voltage controlled oscillator is connected one output of the 25 c./s. reference generator 38, the other output of which is fed to the phase detector 40. The feeding in of the low frequency from the generator 38 varies the voltage controlled oscillators frequency so that if the tracking circuit is working correctly, the output of the phase detector 30 will alternately go positive and negative at the frequency of the generator 38. This output frequency is compared by the phase detector 40 with the reference signal from generator 38, so that if the phase relation between the two signals is correct, the output from phase detector 40, amplified by amplifier 41, will operate relay 42 to switch the switch 37 back to the output of phase detector 30. It will be seen that the relay 42 will operate when the tracker is properly locked.

In FIGURE 2 is shown an alternative embodiment of this invention in which the laser 10 is of the kind having mirrors 46 and 47 at either end, the coherent light beam 100 being directed on to the moving object 19 by the lens system 18 as before. With this arrangement however, the reflected light is passed back through the laser to the photomixer 20 which receives not only light directly from the laser but light reflected back and amplified by the laser. Provided that the frequency of the reflected light is within the frequency band of the laser, the light will be amplified and it is possible to use a relatively simple and less sensitive photomixer 20. The output from the photomixer 20 will contain the Doppler beat frequency, modulated as before at the chopper frequency by the rotating disc 16 driven from the motor 17 as before, the output from photomixer 20 being fed through the amplifier 49 to the mixers 21 and 22 as previously described. The remainder of the system operates in the same way as does the system described in FIGURE 1. In both systems, the lamp 39 may be illuminated when a signal is received from relay 42 to indicate that the circuit is tracking correctly.

We claim:
1. In a Doppler velocity measuring apparatus having a laser directing a coherent light beam along a predeter- mined path onto a moving object and photoelectric means receiving light both directly from the laser and reflected back from the moving object, said photoelectric means producing an output containing a Doppler beat frequency representative of the velocity of said moving object, the combination comprising:

modulation means in said path modulating said light beam at a predetermined frequency; and a voltage controlled oscillator, said oscillator providing two outputs in phase quadrature;

a pair of first mixing means, said mixing means each mixing the output from said photoelectric means with one of said oscillator outputs;

further mixing means coupled to said first mixing means to receive said mixed outputs and providing a combined signal thereof;

phase shifter means being coupled between one of said first mixing means and said further mixing means, said phase shifter means shifting the respective mixed output by 90°;

a reference signal generator providing a reference signal at said predetermined modulation frequency; and phase detector means comparing the phase of said combined signal and said reference signal, said phase detector means having an output producing a direct voltage signal representative of the phase comparison, said phase detector output being coupled to said voltage controlled oscillator.

2. The combination set forth in claim 1 wherein the modulating means comprises a motor coupled to drive a rotatable perforated disc arranged in said path.

3. The combination set forth in claim 1 further comprising low pass filter means coupled between each of the outputs of the said first mixing means and said further mixing means.

References Cited

UNITED STATES PATENTS

| | | |
|---|---|---|
| 2,750,834 | 6/1956 | Golay. |
| 3,202,960 | 8/1965 | Galbraith _____ 343—8 |
| 3,326,078 | 6/1967 | Clarke et al. |
| 3,334,537 | 8/1967 | Beattie. |

OTHER REFERENCES

"Doppler Laser," Electronics, by Leslie Solomon, vol. 35, No. 29, July 20, 1962, p. 26.

"Requirements of a Coherent Laser Pulse-Doppler Radar," Biernson et al., proceedings of IEEE January 1963, pp. 202–209, relied upon.

RONALD L. WIBERT, *Primary Examiner.*

V. P. McGRAW, *Assistant Examiner.*